Figure 1:
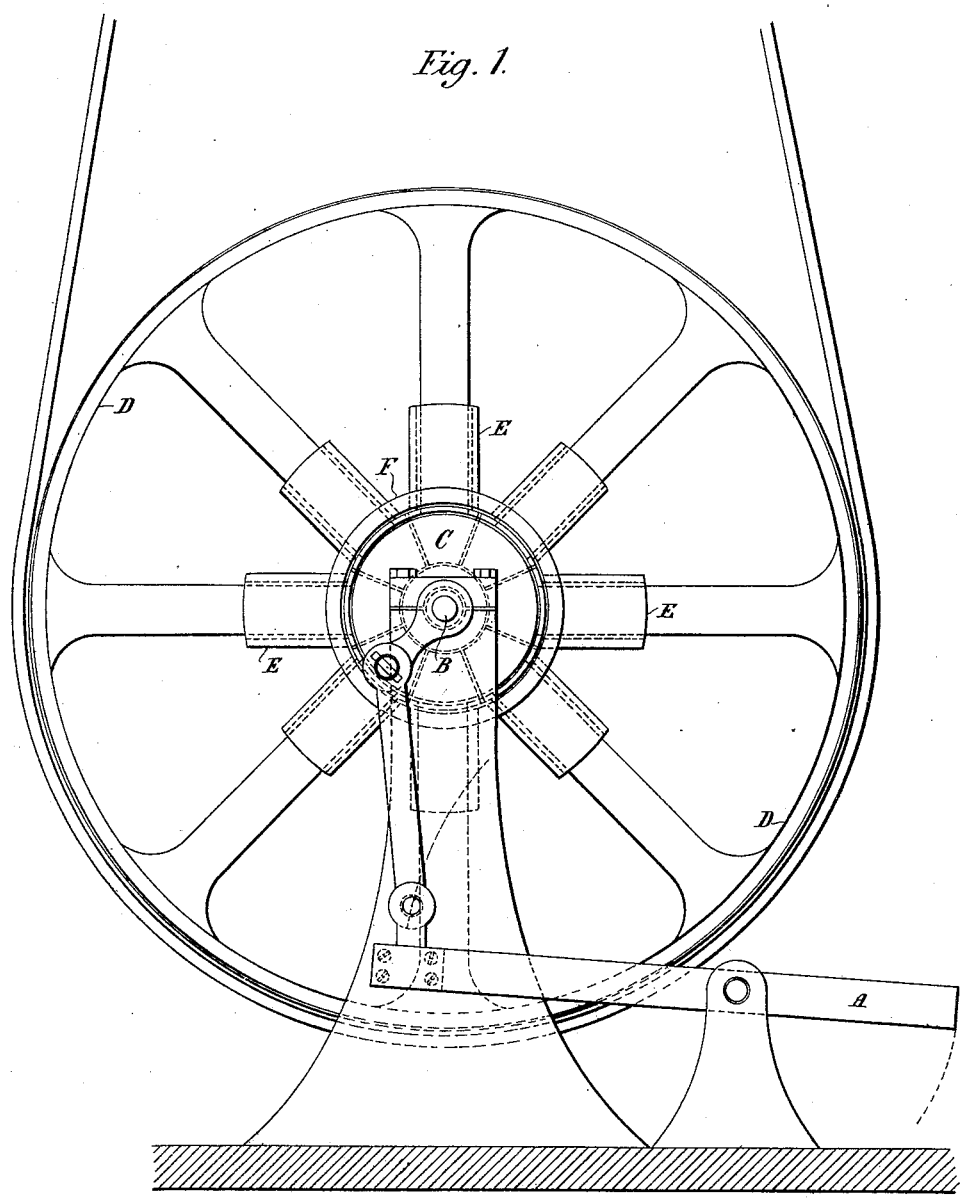

(No Model.) 6 Sheets—Sheet 1.

W. DONISTHORPE & W. C. CROFTS.
METHOD OF PRODUCING INSTANTANEOUS PHOTOGRAPHS.

No. 452,966. Patented May 26, 1891.

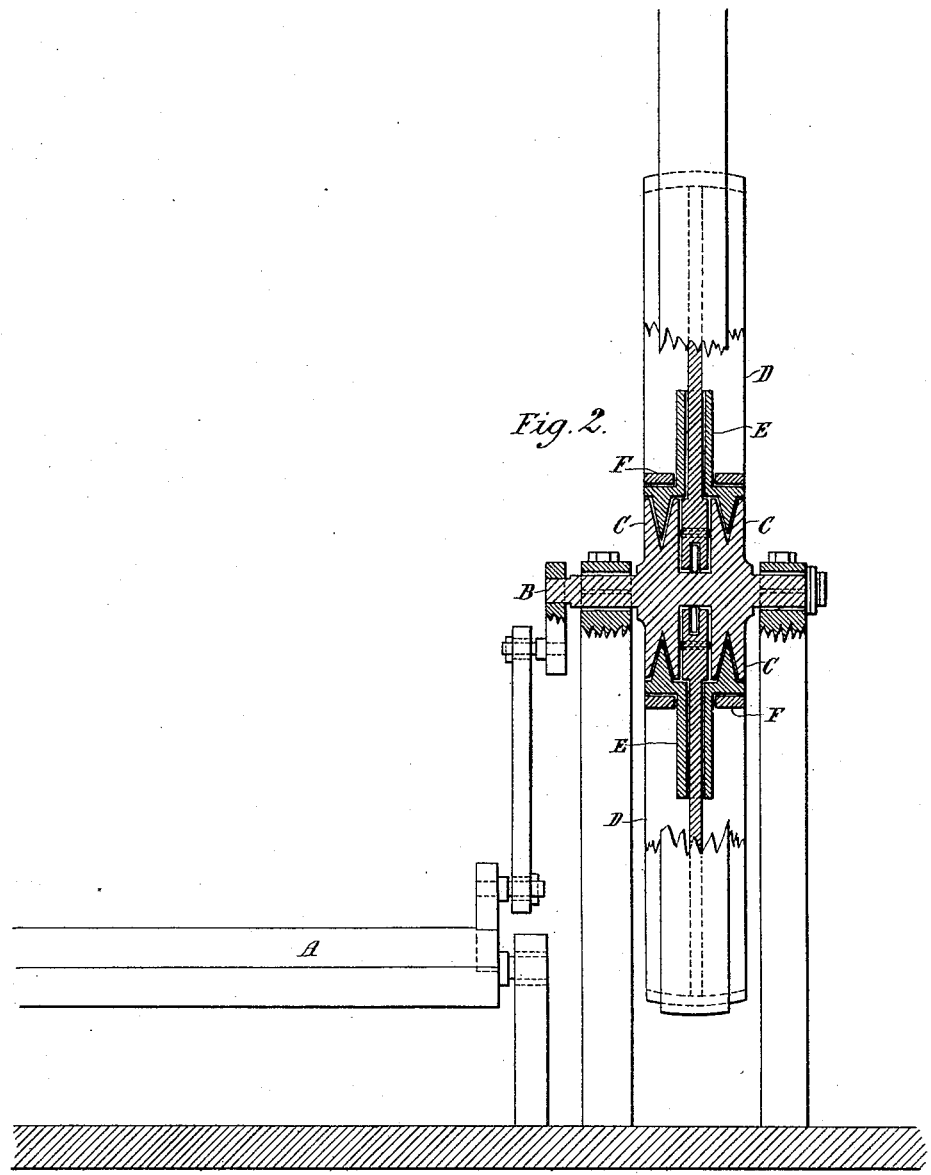

(No Model.) 6 Sheets—Sheet 3.
W. DONISTHORPE & W. C. CROFTS.
METHOD OF PRODUCING INSTANTANEOUS PHOTOGRAPHS.
No. 452,966. Patented May 26, 1891.
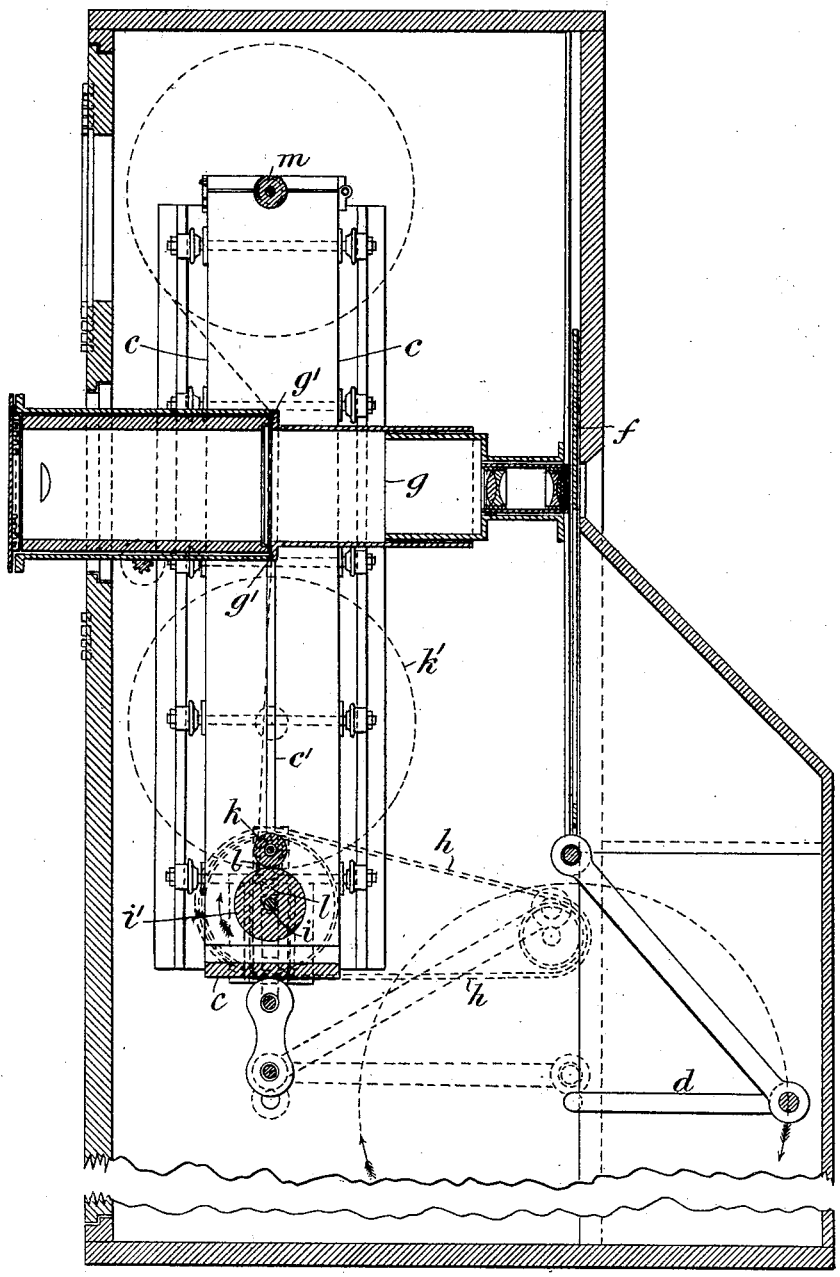

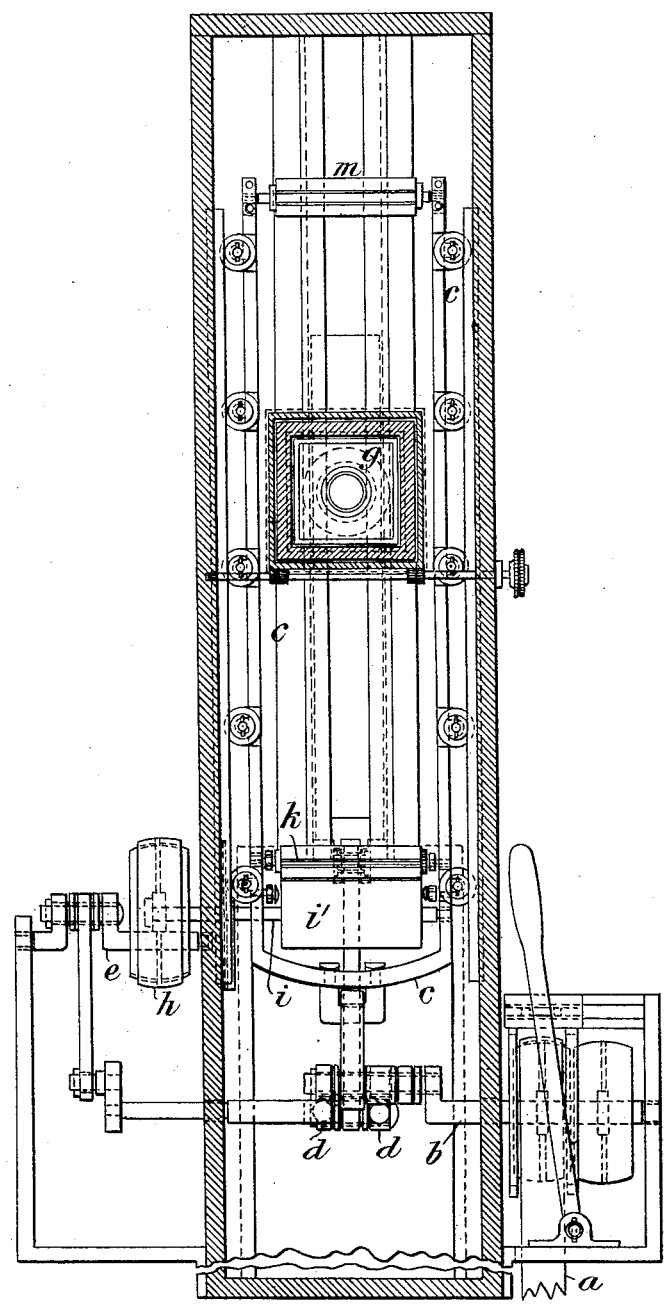

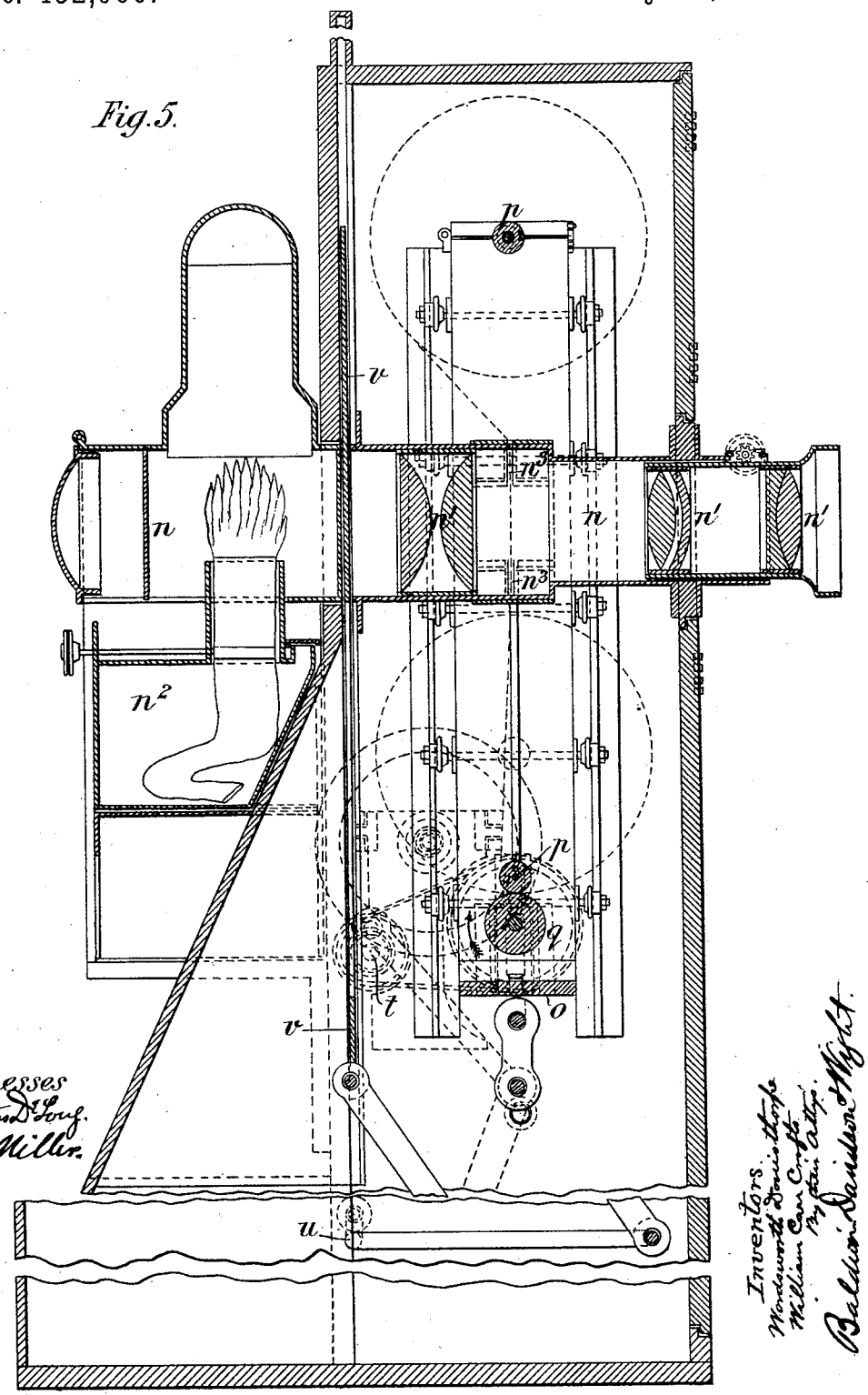

(No Model.)  6 Sheets—Sheet 6.
W. DONISTHORPE & W. C. CROFTS.
METHOD OF PRODUCING INSTANTANEOUS PHOTOGRAPHS.
No. 452,966.  Patented May 26, 1891.
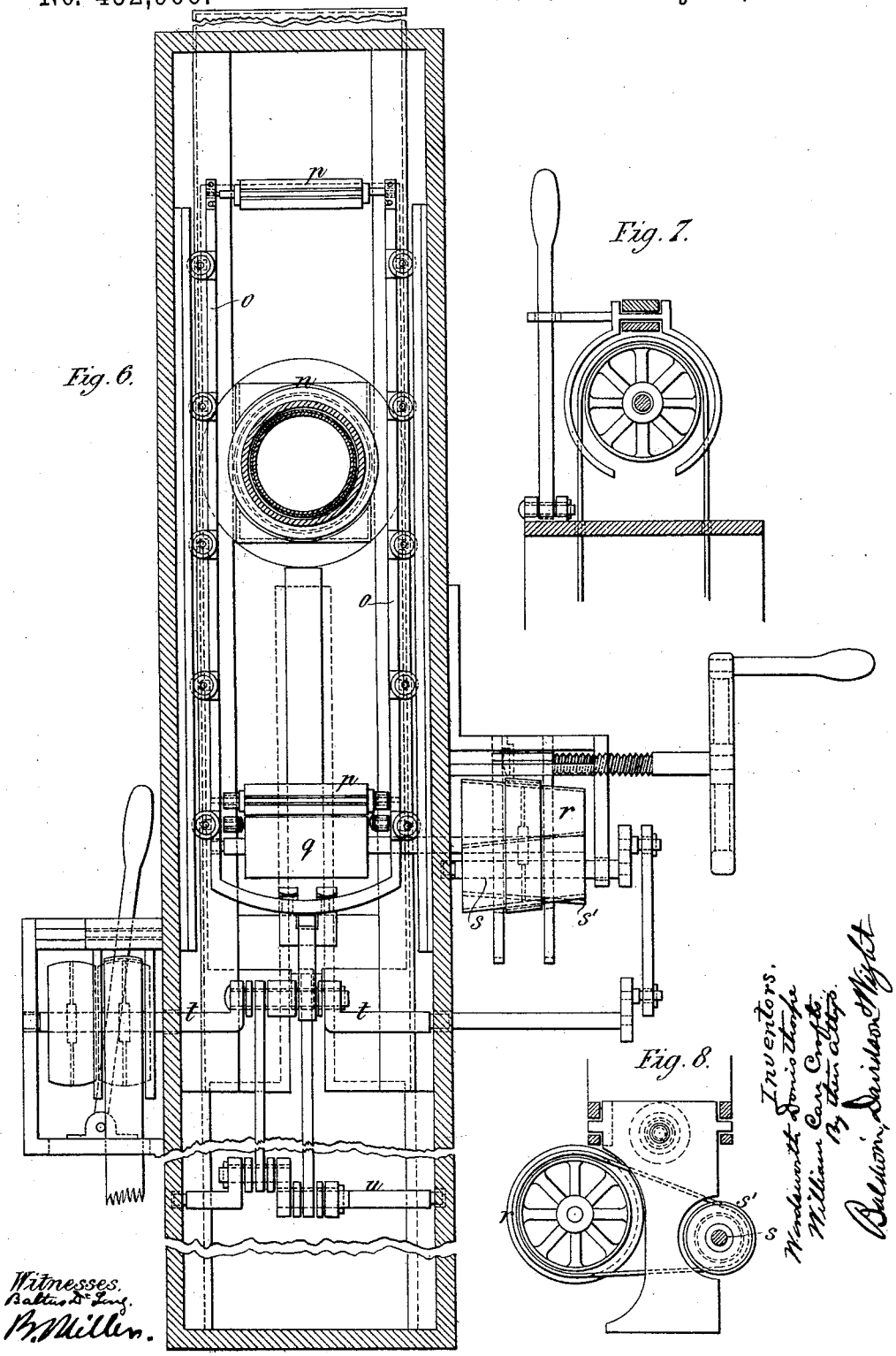

UNITED STATES PATENT OFFICE.

WORDSWORTH DONISTHORPE, OF BAYSWATER, AND WILLIAM CARR CROFTS, OF WESTMINSTER, ENGLAND.

METHOD OF PRODUCING INSTANTANEOUS PHOTOGRAPHS.

SPECIFICATION forming part of Letters Patent No. 452,966, dated May 26, 1891.

Application filed November 11, 1890. Serial No. 371,086. (No model.)

*To all whom it may concern:*

Be it known that we, WORDSWORTH DONISTHORPE, barrister at law, residing at 32 Pembridge Villas, Bayswater, in the county of Middlesex, England, and WILLIAM CARR CROFTS, gentleman, residing at Westminster Chambers, 7 Victoria Street, in the city of Westminster, England, subjects of the Queen of Great Britain, have invented certain new and useful Improvements in the Method of Producing and Representing Instantaneous Photographic Pictures, of which the following is a specification.

Our object is to project photographic pictures on a screen, reproducing all motions as in nature. The data we start from are, first, that the eye can receive an instantaneous impression and that it retains the impression for about one-seventh of a second; second, that paper or transparent film can be chemically prepared, so as to register instantaneous impressions focused upon it through a lens, and, third, that such sensitive material can be made in continuous bands. We take by a suitable camera at intervals of any duration (usually at equal intervals, recurring from eight to six times in a second) a series of as many instantaneous consecutive photographs on sensitized material of moving objects as desired. We exhibit such series of photographs by transparencies reproduced from them, being thrown through the lens of a suitable lantern upon a screen or other proper surface consecutively at a rate not slower than eight to six in a second, with a blank interval between each picture not longer than one-sixteenth to one-twelfth of a second. We render the sensitized surface stationary relatively to the camera-lens during each exposure, and each reproduction of the photographic picture thus obtained we also render stationary relatively to the lantern-lens during its exhibition.

Speaking in general terms, we effect our object in the following manner: We have a photographic lens fitted to a suitable camera exposed and shut at intervals, (usually at equal intervals recurring from eight to six times in a second,) throwing a succession of instantaneous images of moving objects upon a continuous band of sensitive paper or transparent film unceasingly traveling behind the lens; but while so unceasingly traveling, the band by a compensating motion is rendered stationary relatively to the lens during each successive instantaneous exposure, so that each image is imprinted thereon next to and touching the preceding image without overlapping it, and from such continuous band of negative pictures duly developed a series of positive pictures touching but not overlapping one another are printed upon a continuous band of transparent film, and this positive band is then made to travel unceasingly behind the lens of a lantern; but while so unceasingly traveling the band by a compensating motion is rendered stationary relatively to the lens during each successive exposure, recurring not less than eight to six times in each second, so that at each exposure of the lens, the interval between two exposures being not longer than one-sixteenth to one-twelfth of a second, the center of each picture is opposite the center of the lens, and the image of each picture thus exposed is thrown by the lens in a magnified form upon a screen or other suitable surface. In this way we cause the spectator's eye to receive therefrom the impression of each picture just as the impression of the preceding picture is fading from the retina, which retains it until replaced in its turn by the impression of the succeeding picture, and so on. Thus the blank intervals between the successive exposures of the pictures are not appreciated by the eye, and the general impression produced is that of continuous motion corresponding to the successive positions of the moving objects in the series of positive pictures.

In order that our said invention may be fully understood and readily carried into effect, we will proceed to describe the drawings hereunto annexed.

Figure 1 is a side elevation, and Fig. 2 is a transverse vertical section, of the driving mechanism which we employ to impart movement with the requisite regularity to the machine-camera and to the lantern. A is a treadle to be worked by the foot. By means of a connecting-rod it drives the crank-axis B. On the axis B are grooved pulleys C C, and between these pulleys are the spokes of a belt-pulley D. The spokes abut upon a loose ring surrounding the axis B. E E are socket-pieces through which the spokes pass and movable upon them. These socket-pieces have dovetailed projections at their inner ends, which are received into the grooves in the pulleys C C. F F are elastic bands surrounding the socket-pieces E and pressing them inward. When the axis B is turned, the frictional holding between the parts in contact causes the socket-pieces to be carried around, and the belt-pulley D travels with them. When the proper speed is attained, centrifugal force overcomes to a certain extent the spring-bands F, and the socket-pieces move outward sufficiently to release the frictional holding by which the belt-pulley D is driven, so that an excessive speed can never be attained.

Fig. 3 is a side elevation of the machine-camera. It is shown partly in section and with the side of the case removed. Fig. 4 is a rear elevation of the camera, also partly in section. $a$ is a driving-belt receiving motion from the apparatus shown by Figs. 1 and 2. It imparts movement to an axis $b$, on which there are fast and loose pulleys, as shown, and there is a starting-lever for shifting the belt from one pulley to the other. On the axis $b$ there is a crank, and a connecting-rod from this crank is attached to a frame $c$ and gives a reciprocating motion to it in suitable guides. Another crank on the axis $b$ by means of a connecting-rod imparts rotary motion to an axis $d$, and a third crank in like manner drives an axis $e$; or in place of employing cranks and connecting-rods the axes $d$ and $e$ may be driven from the axis $b$ by toothed wheels or pulleys and belts. The axis $d$ causes the shutter $f$ to travel to and fro in guides upon the frame. This movement may be imparted by means of a crank and connecting-rod, as shown, or axis $d$ may be dispensed with and the movement imparted by means of an eccentric on axis $b$ with vertical connecting-rod and horizontal lever working an arm at right angles attached to the shutter. $g$ is a camera, which is firmly supported upon the frame of the instrument. The shutter $f$ is immediately in front of the camera-lens. There is an elongated hole in the shutter, so that the shutter alternately covers and uncovers the camera-lens. The axis $e$ by means of a belt $h$ and pulleys drives an axis $i$, which is carried upon the moving frame $c$. There is a drum $i'$ on this axis, and the roll of sensitive paper or transparent film rests on the drum. $k$ shows the core of the roll to which the long strip of paper or material is attached by one end. The dotted lines $k'$ show the roll when by winding it has reached its largest dimensions. The axes of the core $k$ are retained in grooves $c'$ in the frame $c$. $l\ l$ are elastic bands which keep the roll in contact with the drum, so that as the axis $i$ rotates the roll may be turned at a uniform surface speed and the sensitive paper or material wound upon it. $m$ is the core of the upper roll. The paper or material is wound upon this when it is at the commencement put into the machine. The axes of the core $m$ are held in bearings at the top of the frame $c$ in such manner as to be able to turn easily and yet not too freely. The paper or material passes down from the upper roll to the lower roll through slits $g'$ $g'$ in the camera $g$. The camera is so adjusted by means of ordinary focusing arrangements that an image is thrown by the lens upon the paper or material. The movement of the shutter $f$ admits light to the camera several times in each second, and during these admissions the paper or material is stationary, for although it is still being wound from one roll to the other this motion is compensated by the movement in the contrary direction of the frame $c$, which carries the rolls. In the intervals when the shutter closes the camera the movement of the paper or material is rapid, for then the movement of the frame is in the same direction as the winding motion. Consequently the successive pictures do not overlap. The camera may conveniently be of such dimensions as to produce a well-defined image two and one-half inches in diameter. When a series of pictures has been taken with this apparatus, the roll is removed from the machine and the pictures are developed by well-known means. Then a continuous band of transparent positive pictures is printed from the negative pictures first obtained. These are prepared upon thin pliable transparent film or other suitable material.

Fig. 5 is a vertical section of the machine-lantern by the aid of which the pictures are exhibited. Fig. 6 is a front elevation, partly in section, of the same. Figs. 7 and 8 show details. $n$ is the lantern for exhibiting the pictures. $n'\ n'$ are the lenses, and $n^2$ is the lamp. This lantern should be able to focus a disk ten feet in diameter onto a screen fourteen feet distant. $o$ is a frame carrying upper and lower rolls $p\ p$, as in the case of the camera already described, and at $n^3\ n^3$ the band of pictures as it is wound from one roll to the other passes through the lantern. The lower roll rests upon a drum $q$, which is caused to revolve continuously, and so a uniform winding forward of the pictures is obtained, as already described in respect to the camera. The axis of the drum $q$ carries a cone $r$, and this is driven by a belt from another cone $s'$ on an axis $s$. By means of a hand-wheel and screw and belt fork, as shown, the belt can be shifted along the cones and the speed of driving varied. The axis $s$ is driven from a main axis $t$ by means of cranks and a connecting-rod. Another crank on the axis $t$ imparts a reciprocating motion to the frame $o$. A third crank on the axis $t$ in like manner drives an axis $u$, and this by a crank and connecting-rod gives movement to the shutter $v$, or the movement may be imparted by the same means as described in the case of the camera; or, in place of employing cranks and connecting-rods, the axes $s$ and $u$ may be driven from the axis $t$ by toothed wheels or pulleys and belts. The axis $t$ is driven at a regular speed by a driving-belt from apparatus such as is shown by Figs. 1 and 2. The shutter $v$ shuts off the light of the lantern from the screen several times in each second, and while the light is so shut off the band of pictures is drawn rapidly through the lantern both by the winding forward of the band and by the movement of the frame which carries the rolls. On the other hand, when the light is thrown by the lantern onto the screen the picture is stationary in the lantern, the winding movement then being neutralized by the motion of the frame $o$ in the contrary direction. In this way, say, eight reflections per second, each one-sixteenth of a second's duration, (separated by blank intervals of the same duration,) are thrown through the positive pictures on the transparent traveling band and through the object-glass in a magnified form onto the screen, and the general impression of continuous natural motion in all moving objects is thereby produced.

The mechanism may be varied; but

What we claim is—

The process herein described for taking and exhibiting at a high speed consecutive but not recurring series of an indefinite number of photographic pictures of objects in motion, such process consisting in causing the band on which are the pictures to be wound continuously past the lens of a suitable optical apparatus, while at the same time both a frame or part carrying the winding apparatus and a shutter which obscures the lens are caused to receive reciprocating movements, the whole in such manner that when the shutter uncovers the lens the picture-band is at rest relatively to the lens, and when the lens is obscured by the shutter the picture-band travels rapidly past it.

WORDSWORTH DONISTHORPE.
WILLIAM CARR CROFTS.

Witnesses:
JOHN D. VENN,
8 *St. Martin's Place, Trafalgar Square, Notary's Clerk.*
WILLIAM BATES,
*Clerk to John Venn, Notary, 8 St. Martin's Place, Trafalgar Square, London.*